(12) United States Patent
Garfinkle et al.

(10) Patent No.: US 8,478,646 B2
(45) Date of Patent: Jul. 2, 2013

(54) PROVIDING TARGETED CONTENT TO USERS BASED ON USER INTERESTS

(75) Inventors: Norton Garfinkle, New York, NY (US); Richard Garfinkle, Chicago, IL (US); Devra Garfinkle Johnson, Philadelphia, PA (US)

(73) Assignee: Democracyontheweb, LLC, New York, NY (US)

( * ) Notice: Subject to any disclaimer, the term of this patent is extended or adjusted under 35 U.S.C. 154(b) by 108 days.

(21) Appl. No.: 13/079,495

(22) Filed: Apr. 4, 2011

(65) Prior Publication Data

US 2012/0253942 A1    Oct. 4, 2012

(51) Int. Cl.
*G06Q 30/00*    (2012.01)
(52) U.S. Cl.
USPC ............... 705/14.66; 705/14.23; 705/14.49; 705/14.51
(58) Field of Classification Search
USPC ......................................... 705/14.66
See application file for complete search history.

(56) References Cited

U.S. PATENT DOCUMENTS

| | | | |
|---|---|---|---|
| 7,707,167 B2 * | 4/2010 | Kishore et al. ................ | 707/600 |
| 2004/0030598 A1 * | 2/2004 | Boal ............................... | 705/14 |
| 2008/0201643 A1 | 8/2008 | Nagaitis et al. | |
| 2009/0044246 A1 | 2/2009 | Sheehan et al. | |
| 2011/0066497 A1 | 3/2011 | Gopinath et al. | |

OTHER PUBLICATIONS

Pasule, "8 Steps to Regain Control of Your Facebook Privacy", MakeUseOf.com, Jan. 12, 2010.*
Anupam et al., "On the security of pay-per-click and other Web advertising schemes", published by Elsevier Science B.V., 1999.*
Golder et al., "Rhythms of social interaction: messaging within a massive online network", HP Labs, 2006.*
Barron, "Viral politics 2008: how social media is changing the presidential debate", OJR: The Online Journalism Review, Annenberg School for Communication & Journalism, University of Southern California, Oct. 7, 2007, found online at ojr.org/ojr/stories/071004Barron/.*
Search Report and Written Opinion dated Jun. 22, 2012 issued for International PCT Application No. PCT/US2012/032147 filed Apr. 4, 2012.

* cited by examiner

*Primary Examiner* — John Weiss
*Assistant Examiner* — Scott C Anderson
(74) *Attorney, Agent, or Firm* — K&L Gates LLP

(57) ABSTRACT

Methods for targeting content based on user interests. A graphical user interface may be provided to a first user. A plurality of interest categories may be displayed to the first user through the graphical user interface. An indication of a first category selected from the plurality of interest categories may be received from the first user. Upon receiving the indication of the first category, a plurality of sub-categories of the first interest category may be displayed to the first user through the graphical user interface. Additionally, an indication of at least one selected sub-category chosen from the plurality of sub-categories may be received from the first user. A first plurality of content items based on the at least one selected sub-category may be selected. The first plurality of content items may be provided to the first user through the user interface.

30 Claims, 17 Drawing Sheets

PROVIDING TARGETED CONTENT TO USERS BASED ON USER INTERESTS

BACKGROUND

One of the primary uses of the Internet is content provision. Content may include any kind of content accessible via the Internet including, for example, textual content items, multimedia content items, etc. Content providers distribute, and sometimes also generate, content items that are made accessible to Internet users (e.g., content consumers). One of the greatest difficulties for users and content providers alike is determining the content items that any particular user is interested in receiving. It is known to address this problem by generating, by and/or for each user, a user profile. The user profile is an indication of the user's specific interests, which may then be matched with specific content items to be provided to the user.

There are two known ways for generating user profiles. In one method, user profiles are generated automatically based on the behavior of the user. For example, if a user visits a web site at which he or she makes a purchase, the kind of object purchased is stored and the user is presumed to have an interest in other things like the ones they have purchased. This indirect method is outside user control and prone to error. For example, a person buying gifts for others would likely be profiled as being a user of the products purchased. The method also fails in terms of what it remembers. A user whose interests change over time can be characterized by a profile based in part on past interests that they have given up.

Another known way to generate user profiles involves allowing the user to select interests from broad categories. In this method, the user selects very general interests (such as in News, Sports, etc), like selecting which newspaper sections they read or TV networks they watch. This approach is user driven, but is not specific. Often this is because of the difficulty of enticing users to make the time commitment necessary to submit detailed information. Further concerns about privacy make some users reluctant to provide more detailed information. Accordingly, the profiles that emerge from this method often do not provide a sufficiently precise guide to the specific information the user would like to receive.

FIGURES

Various embodiments of the present invention are described here by way of example in conjunction with the following figures, wherein.

DESCRIPTION

Figure 1:
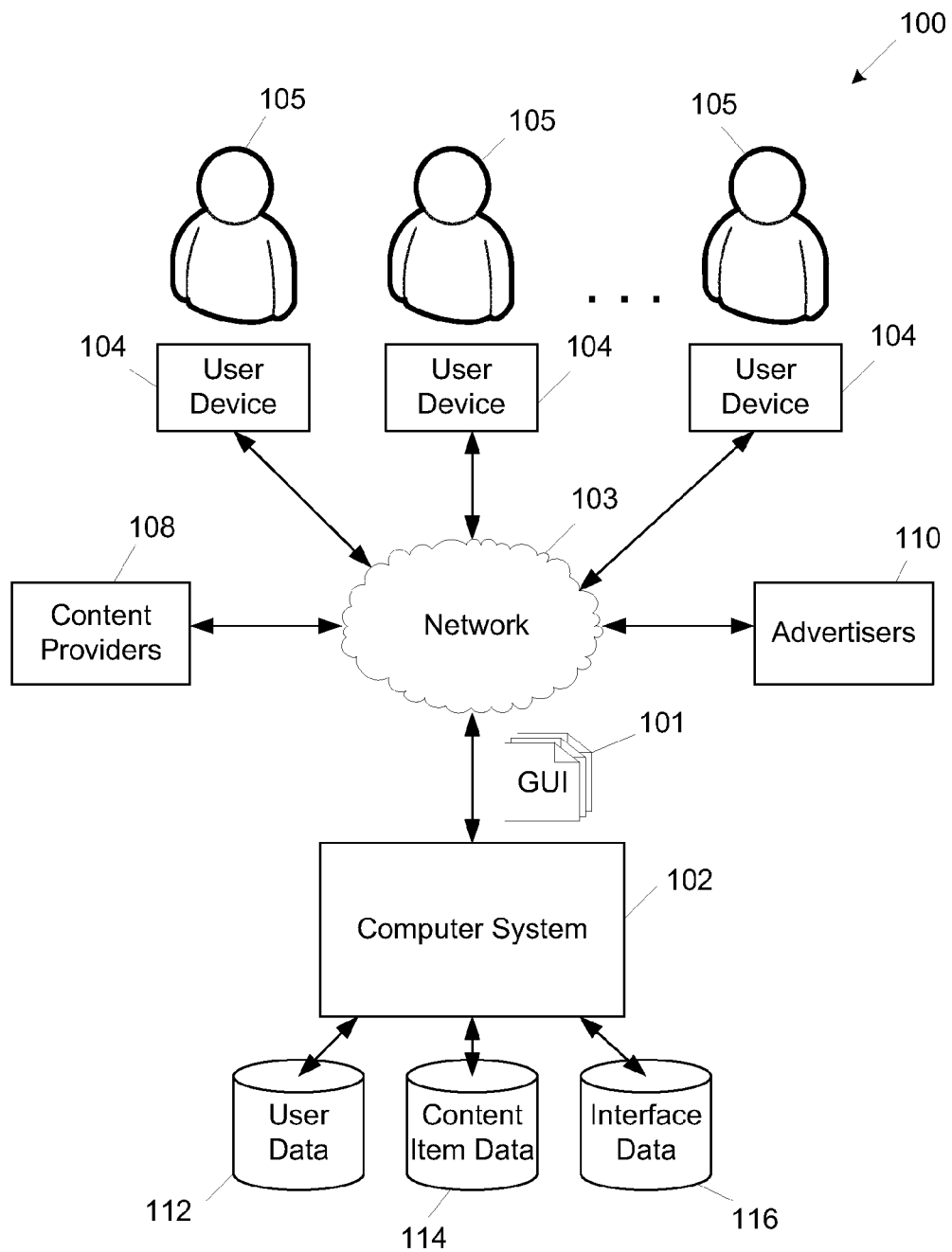
FIG. 1 illustrates one example embodiment of a system that may be used to implement a graphical user interface (GUI).

Various embodiments are directed to systems and methods for targeting content based on user interests. For example, a graphical user interface (GUI) may be provided to the user by a computer system. The GUI may be directed to a specific class of interests (e.g., designed to attract a specific type of user.) For example, the GUI may be directed to, and may provide content items related to, current events and/or politics. For example, the GUI may provide content items related to public issues or news topic, political figures, candidates, political institutions, geographic localities (including countries), organizations, pundits such as columnists, bloggers and cartoonists, media programs, such as television programs, radio programs, Internet broadcast programs, etc. In other embodiments, the GUI may be directed to sports and/or a particular sport or any other class of interests of a user or users. It will be appreciated that although the GUI is described herein as a graphical user interface, it may be presented to a user or users in any graphical, textual or other suitable form or format.

To generate a user's profile, the computer system may prompt the user, through the GUI, to provide detailed user information. For example, the computer system may present to the user, through the GUI, an indication of a plurality of potential interests. Each potential interest may describe an interest that may be correlated to content items that the user may want to receive. The user may select one or more of the potential interests via the GUI. Upon receiving a selected interest category, the computer system may provide, e.g., via the GUI, indications of a plurality of sub-categories of the selected potential interest. The user may select one or more of the sub-categories again, for example, via the GUI. The selected sub-categories and, in some embodiments, the selected potential interest may form all or a part of the user's profile. The user's profile may, in turn, be utilized by the computer system to select content items that may be of interest to the user. Accordingly, the user may maintain control over at least a portion of the contents of the user profile. At the same time, however, the nested nature of the interests may allow the user to quickly and efficiently provide interest information that is detailed enough to identify meaningful content of interest.

In some embodiments, the computer system (e.g., via the GUI) may provide various functionalities in addition to content provision. For example, the computer system may provide functionality for matching and facilitating interaction between users having similar interests, discussion boards allowing users to discuss interests, and information and/or advertisements that may direct the users to products, offers and/or opportunities that may be of interest to the user. In some embodiments, this additional functionality may provide users with additional motivation to provide detailed user profiles.

In various embodiments, the computer system may provide users with functionality for finding other users for interaction and/or for sharing content items. For example, a user may utilize the GUI to identify other users having similar interests (e.g., based on the user's profile). Such users may be referred to as friends. Users may be provided with functionality for sending or posting messages either to a particular friend or group of friends. Also, for example, users that are friends may have access to common resources through the GUI. Such resources may include, for example, messages or posts provided by one of the users, other content items, etc. Also, in various embodiments, the computer system may provide, through the GUI, a forum section allowing users to post and/or respond to messages accessible to all or a large portion of other users (e.g., not just friend users).

According to various embodiments, the computer system may provide information and/or advertisements to users through the GUI based, for example, on the user profile developed as described herein. Advertisements may be provided to users in various forms and formats. For example, the computer system may receive advertisement content from advertisers. Each user's profile may be used to match the user with advertisement content, for example, in the same manner that the user's profile is used to match a user with other content items. The advertisement content determined to be of the highest interest to a particular user may be provided to the user via the GUI. Advertisers may be charged based on the number of times that an advertisement is provided to a user, a number of times that any user clicks through the advertisement to visit the advertiser's site, etc.

In some embodiments, users may be provided with functionality to specify different levels of privacy within the user's profile. Each privacy level may describe a user or set of users who are authorized to access the associated interest and/or content items retrieved based on the interest. For example, each user may have a home page, as described herein. User's may access each other's home pages. A user viewing another user's home page, though, may only view content items retrieved based on the host user's interests that are accessible to the viewing user. Example privacy levels that may be used include, for example, user only, friends only and public. Interests classified according to a user only privacy level may only be accessible to the user. For example, a user may have interests that the user does not want to be known to other users. Interests classified as friends only, and content items retrieved based on the same, may be accessible only to friends of the host user. Finally, interests classified as public, and content items retrieved based thereon, may be viewable by any user. According to various embodiments, the privacy classification of the user's interests may also determine the use to which the interests are put by the computer system. For example, interests from a user's profile indicated to be public may be used by the system for many purposes (e.g., selecting content items, selecting friends for the user, etc.). System use of the user's more private interests (e.g., those viewable by fewer other users) may be more limited. For example, private interests may be used to select some content items to be provided to the user (e.g., news stories, advertisements, etc.). According to various embodiments, private interests are not be used to select friends for the user. In this way, the user may specify interests to be used for selecting friends (e.g., public interests, friends only interests, etc.), while continuing to receive other content items based on other, private interests.

According to various embodiments, content items may also be classified based on levels of privacy. For example, public content items may be content items selected for display to the user based only on the public interests of the user's profile. Generally, private or non-public content items may be content items that are selected for display to the user based on the user's non-public interests. In some embodiments, public interest data may also be used to select private content items. It will be appreciated that different categories of private content items may exist, for example, based on different levels of privacy levels identified with respect to the user's non-public interests. The privacy classification of content items may be determined according to any suitable method. For example, non-public levels of content items may generally include content items that can be provided to the user without compromising any information about the user to other users not privy to the associated interests. For example, non-public content items may include news stories, commentary, etc. that may be provided to the user via the GUI, for example, in a manner inaccessible to users who are not part of the indicated security level. Public content items, on the other hand, may include content items that either compromise the user interests used to select them and/or may be deemed an intrusion by the user. For example, public content items may include content items that are provided to the user by virtue of a friendship with another user. Other examples of public content items may include advertisements, solicitations, offers, etc. In various embodiments, the distinction between private and public portions of the user's profile may be utilized by other functionality offered by the computer system as well. For example, in various embodiments, public portions of the user's profile may be viewable and/or accessible to other users.

FIG. 1 illustrates one example embodiment of a system that may be used to implement the GUI, as described herein. The system 100 may comprise a computer system 102 in communication with a plurality of user devices 104 via a network 103 to provide a graphical user GUI 101 to the user devices 104. The GUI 101 may be provided to the user devices 104 in any suitable format and according to any suitable delivery tool set. For example, in some embodiments, the GUI 101 may be provided as a hypertext transfer protocol (HTTP) document received at the user devices 104 via a web browser. The computer system 102 may comprise any suitable computer device or devices. The network 103 may be and/or comprise any suitable type of network including, for example, a local area network (LAN), a wide area network (WAN) such as the Internet, etc. The user devices 104 may be any suitable type of computer device capable of communicating with the computer system 102 over the network 103 to receive the GUI 101. For example, the user devices 104 may be and/or comprise personal computers, laptop computers, mobile telephones, personal digital assistants, etc.

According to various embodiments, the computer system 102 may also be in communication with data stores 112, 114, 116. For example, a user data store 112 may comprise data describing user profile (e.g., received as described herein). A content item data store 114 may comprise content items. Content items may be received, for example, from content providers 108 and/or advertisers 110. Content providers 108 may be, for example, online publications and/or other data sources. Advertisers 110 may comprise businesses who desire to reach the users 105 through advertising, special offers, etc. In various embodiments, the advertisers 110 may compensate the computer system 102, as described herein, for the privilege of having their advertising content viewed by the users 105. In various embodiments, some content may be provided by users. For example, users may generate blog posts, forum postings, and other content that may be provided to other users.

Figure 2:
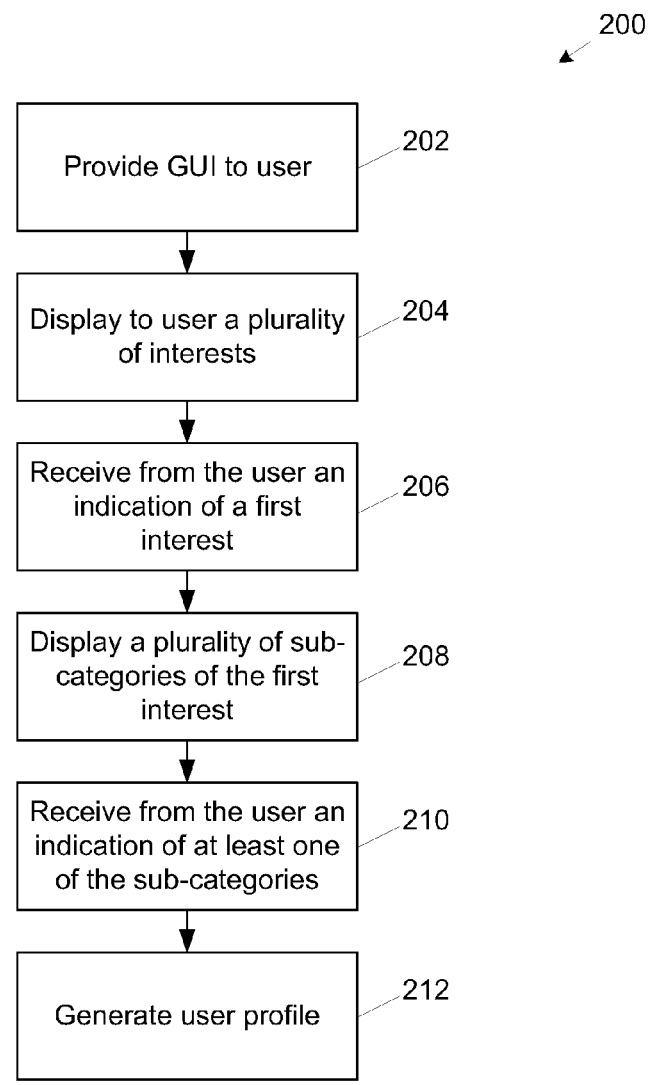
FIG. 2 illustrates a process flow showing one example embodiment for generating a user profile for a user of the system of FIG. 1.

FIG. 2 illustrates a process flow 200 showing one example embodiment for generating a user profile for a user 105 of the system 100. At 202, the computer system 102 may provide the GUI 101 to the user 105 (e.g., via the network). At 204, the computer system 102 may cause the GUI 101 to display to the user 105 a plurality of interests. At 206, the computer system 102 may receive from the user 105 (e.g., through the GUI 101) an indication of a first displayed interest. In some embodiments, the selected interest may be stored in association with an indication of the user (e.g., at the user data store 112) and may form a portion of a user profile associated with the user 105.

At 208, the computer system 102 may cause the GUI 101 to display a plurality of interests representing sub-categories of the first interest. The user 105 may select one or more of the sub-categories (e.g., through the GUI 101). The selected sub-category interests may be received by the computer system 102 at 210. The selected sub-category interests, in some embodiments along with the selected interest categories, may be used to form all or a part of the profile of the user 105. For example, the selected sub-category interests (and the user profile) may be stored at user data store 112. The user profile may, in turn, be used to select content items to be provided to the user 105. Although the process flow 200 describes a two-level set of nested interests (e.g., categories and sub-categories), it will be appreciated that additional levels of nested interests may be used. For example, additional sub-categories of the selected sub-category interest may be displayed for selection by the user 105.

Figure 3:
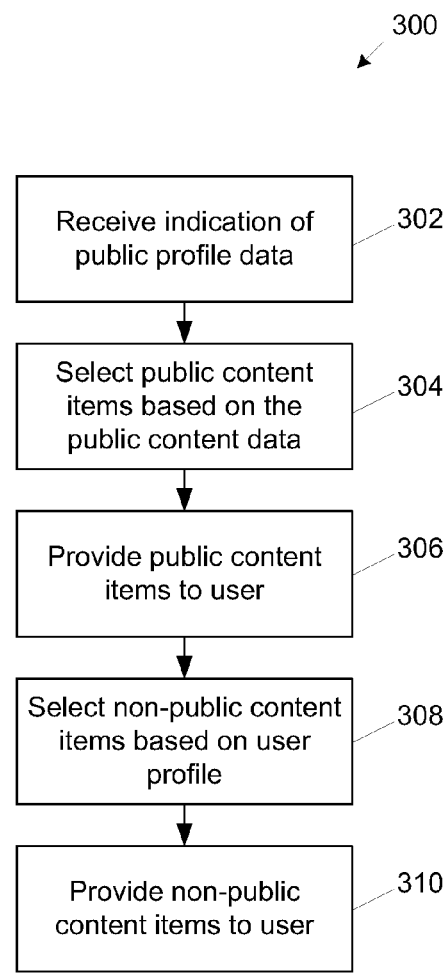
FIG. 3 illustrates a process flow showing one example embodiment for segregating private and public portions of a user's profile.

FIG. 3 illustrates a process flow 300 showing one example embodiment for segregating private and public portions of the profile of a user 105. At 302, the computer system 302 may receive in indication of public profile data (e.g., public interest data) from the user 105. The public profile data may describe all or a portion of the profile of the user 105 that may be used to select public content items (e.g., at least interests of the user 105). The indication may be received from the user 105 at any suitable time. In some embodiments, the user 105 may provide an indication of whether profile data is public at the time that the profile data is provided to the computer system 102, for example, as the user 105 selects interests. Also, in some embodiments, the user 105 may be provided with access to all of the interests and/or other data making up the user's profile. From these, the user may select the interests and/or other data that may be public profile data.

At 304, the computer system 102 may provide the user 105 with public content items based on the public profile data. For example, the public profile data may be used as (and/or be used to generate) search parameters, such as a list of keywords. The search parameters may be applied to public content items (e.g., stored at the content items data store 114) to select public content items matching the search parameters. These items may be provided to the user 105 at 306. Public content items may include, for example, advertisements, solicitations from advertisers, etc. In some embodiments, public content items may comprise indications of friend compatibility and or posts or other content generated by other users. For example, the public profile data may be used to match the user with other users. Results of the matching may bye provided to the first user as public content items.

At 308, the computer system 102 may select non-public content items based on the user's profile. Non-public content items may include content items that are at various levels of privacy below public. For example, non-public content items may include user-only content items (e.g., content items selected based on user-only interests) and friends only content items (e.g., content items selected based on friends only interests). The non-public content items may be provided to the user via the GUI 101 at 310. According to various embodiments, the public and non-public content items may be displayed at a home page of the user. As described herein, the user's homepage may be accessible by other users. The content items on the home page may be accessible based on their privacy level which may be, in turn, based on the privacy level of the interests used to select the content items. For example, public content items may be selected utilizing public interests of the user and may be available to all visitors to the user's home page. Friends only content items may be selected utilizing friends only interests of the user and may be available to the users friends when the friends visit the home page. Also, for example, user only content items may be selected utilizing user only interests and may be available through the home page only to the user. It will be appreciated that different content items may have different privacy levels for different users. For example, a news story content item, if selected based on a first user's user only interest may be a user only content item with respect to the first user. On the other hand, if the same news story content item is selected for a second user's home page based on the second user's public interest, then, with respect to the second user, the news story content item may be a public content item. In some embodiments, some content items, such as user-generated content items like posts, may have a privacy level indicated by the creating user. Also, some content items may have a universal privacy level set and/or stored by the computer system. For example, some advertisements and/or solicitations may be provided to a user only if they are selected based on the user's public interests. (In some embodiments, advertisements may be selected based on all of the interests in a user's profile, regardless of classification.)

FIGS. 4-21 illustrate various example screens of the GUI 101 demonstrating GUI 101 functionality including the functionality described above. The example interface screens of FIGS. 4-21 show a GUI 101 directed to interest items relating to current events and politics. In other embodiments, however, the GUI 101 may be directed to other general interests including, for example, sports, a particular sports, a particular hobby (e.g., hunting, fishing, camping, stamp collecting, etc.).

Figure 4:
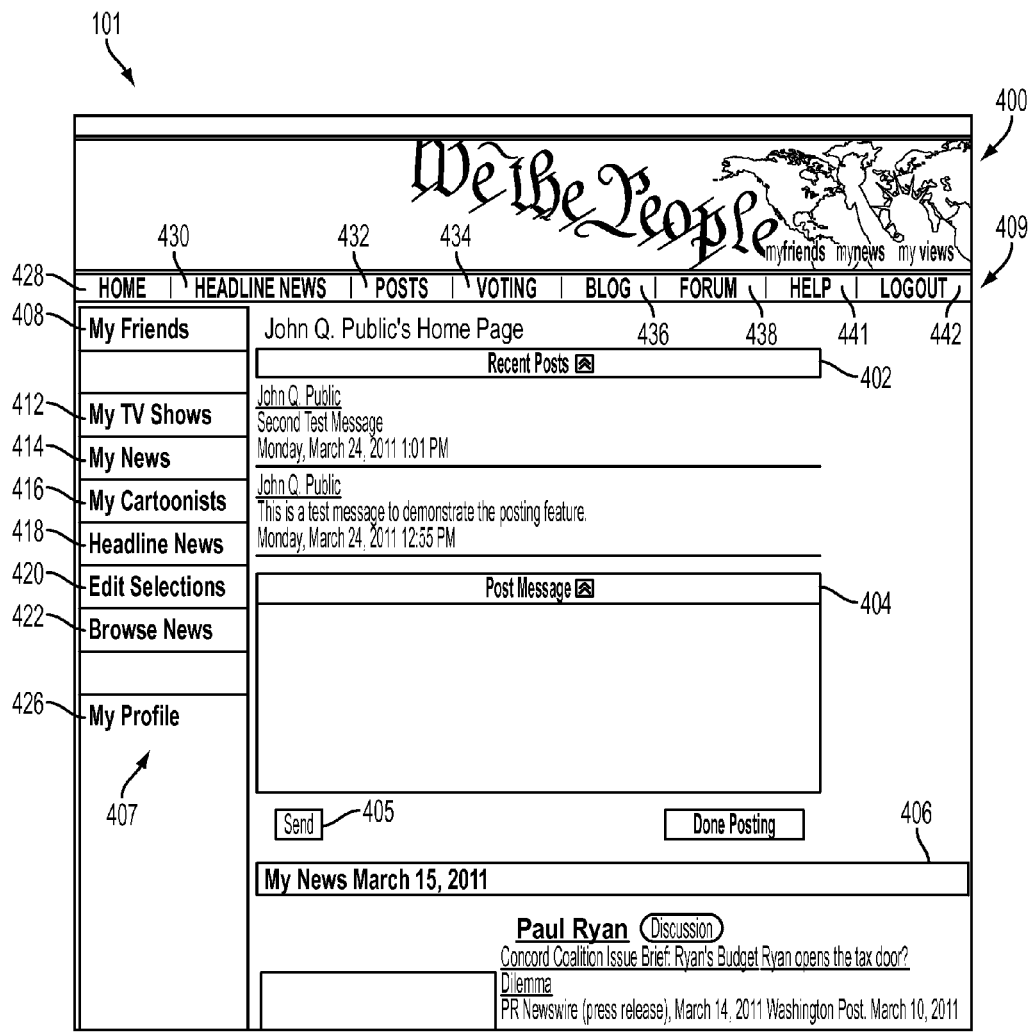
FIG. 4 illustrates one example embodiment of a home page of the interface of FIG. 1.

FIG. 4 illustrates one example embodiment of a home page 402 of the GUI 101. The home page 402 may be specific to a single user 105. For example, the home page 402 may comprise content items selected based on the profile of the user 105. The home page 402 may be accessed, for example, from other pages of the GUI 101 by selecting the Home button 428 from the navigation bar 409. In various embodiments, the home page 402 may be accessed by the single user (e.g., a host user) or by other users. As described above, the content items displayed at the home page may vary depending on the user viewing the page. In various embodiments, the home page 402 may comprise a blog post viewing field 402 and a blog post creation field 404. The blog post viewing field 402 may display indications of blog posts provided, for example, by the user 105 and/or by other users who are friends of the user 105 or whom the user has otherwise authorized to appear on the home page 402. The blog post creation field 404 may comprise an entry field into which the user 105 may type a blog post. Selecting the Send button 405 may cause the blog post to appear at the blog post viewing field 402 of the user 105 (and of any other users who have authorized blog posts from the user 105). The resulting blog post may become a content item that may be displayed to another user or users based, for example, on privacy level settings.

The home page may also comprise a content item field 406. The content item field 406 may comprise indications of and/or links to content items selected for the user 105 (e.g., based on the profile of the user 105). Navigation bars 409 may allow the user 105 to access other functionality of the GUI 101. For example, a navigation bar 407 may comprise buttons for My Friends 408, My TV Shows 412, My Cartoonists 416, Headline News 418, Edit Selections 420, Brows News 422 and My Profile. A navigation bar 409 may comprise buttons for Home 428, Headline News 430, Posts 432, Voting 434, Blog 436, Forum 430, Help 441 and Logout 442. It will be appreciated that some or all of these buttons are included in FIGS. 5-21.

Figure 5:
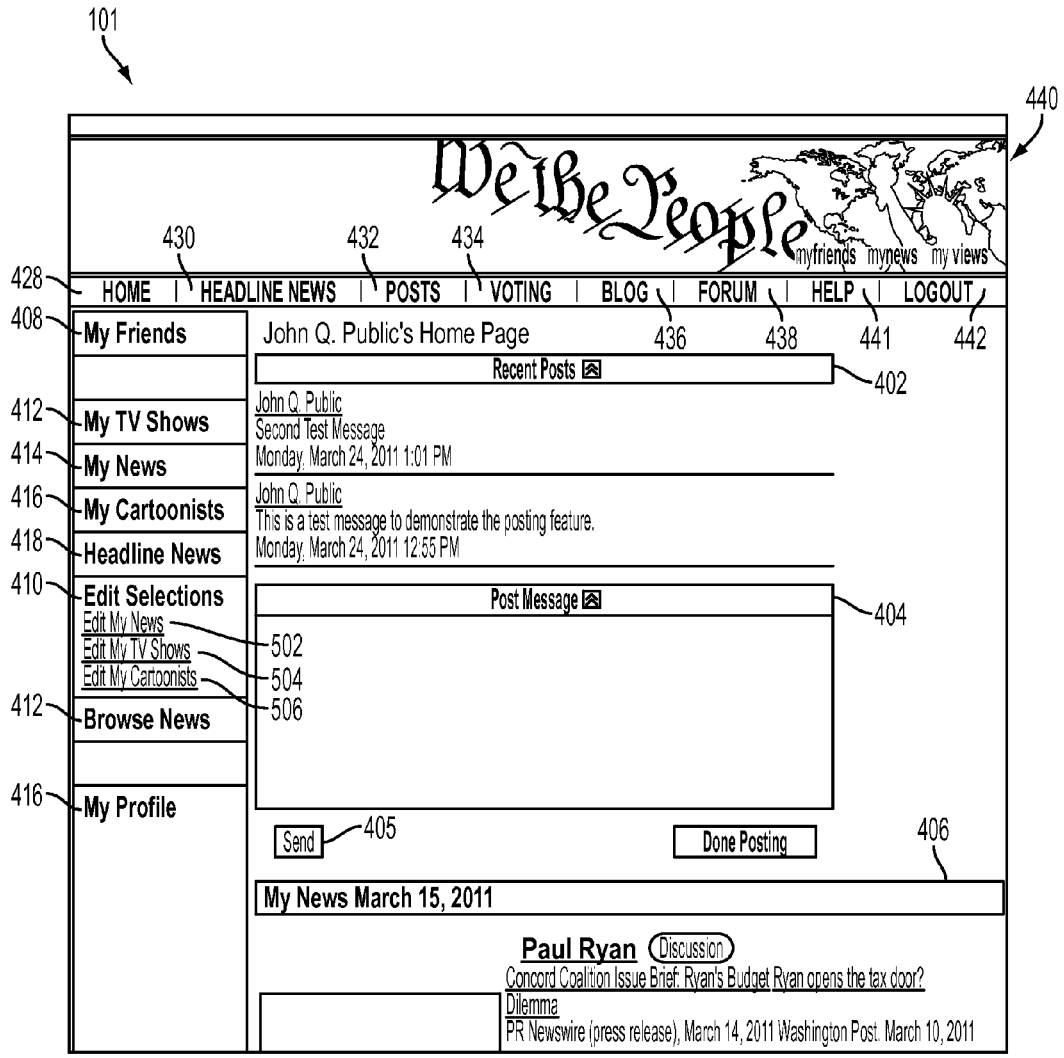
FIG. 5 illustrates one example embodiment of the home page of FIG. 4, showing categories of selections that may be edited by the user.

Several of the buttons of the navigation bar 407 may link to content items corresponding to particular received interests of the user 105. For example, an Edit Selections button 420 may allow the user 105 to enter and/or change the indicated interests making up their user profile. (In various embodiments, these interests may be received, initially, at the time that the user 105 registers with the GUI 101.) FIG. 5 illustrates one example embodiment of the home page 400, showing interest category buttons 502, 504, 506 indicating interest categories that may be edited by the user 105. In the illustrated example, the displayed interest categories include My News, My TV Shows, and My Cartoonists.

Figure 6:
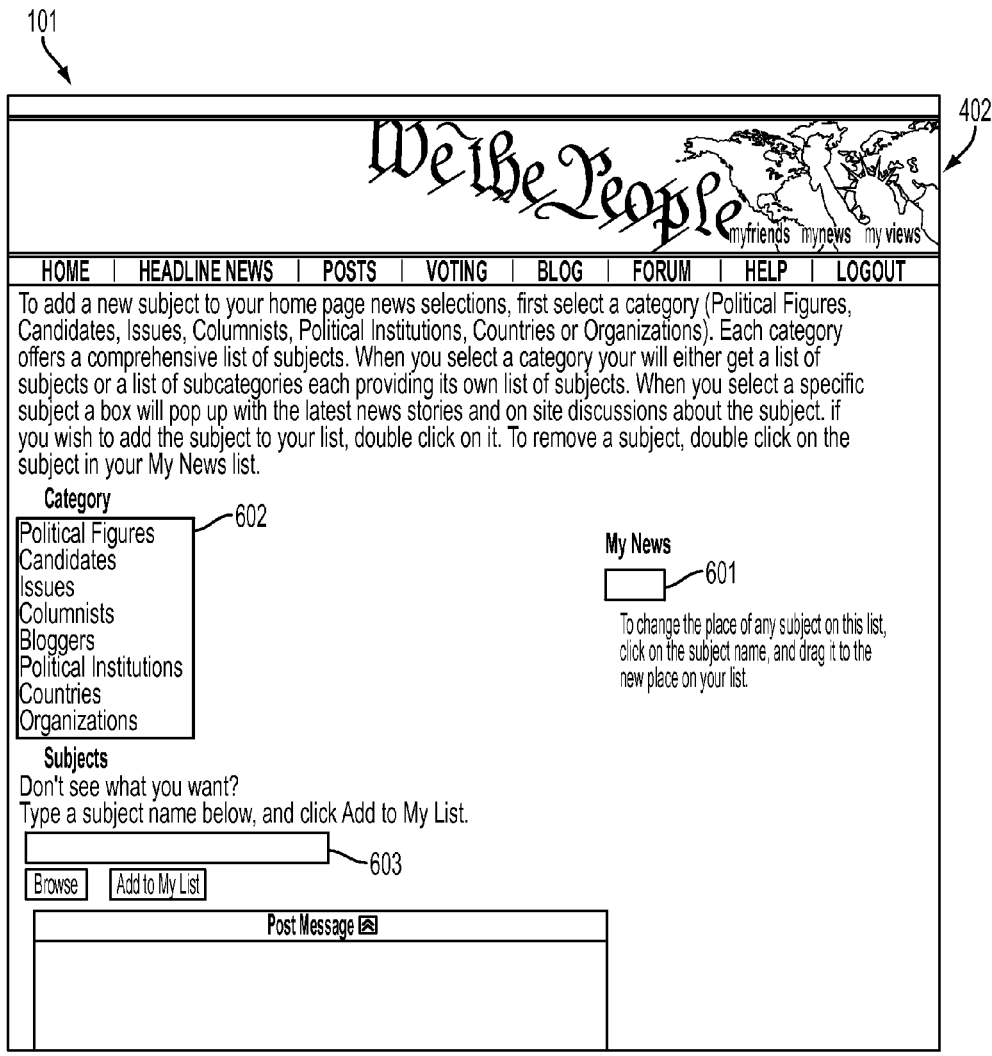
FIG. 6 illustrates one example embodiment of an interest edit screen that may allow the user to edit and/or select interests related to news.

Selecting the Edit My News button 502 may allow the user to select interest categories related to news. FIG. 6 illustrates one example embodiment of an interest edit screen 440 that may allow the user 105 to edit and/or select interests related to news. The interest edit screen 440 may be accessed when the user 105 selects the Edit My News button 502. Included in the interest edit screen are a list 602 of interests that may be sub-categories of the interest category "news." A My News field 601 may indicate interests that have already been selected by the user 105 (e.g., in the example configuration of FIG. 6, none). A search field 603 may allow the user 105 to perform keyword searches to find a desired category, for example, if the desired category does not appear at the list 602. The user 105 may select a category from the list 602. The selected category may be added to the My News field 601.

Figure 7:
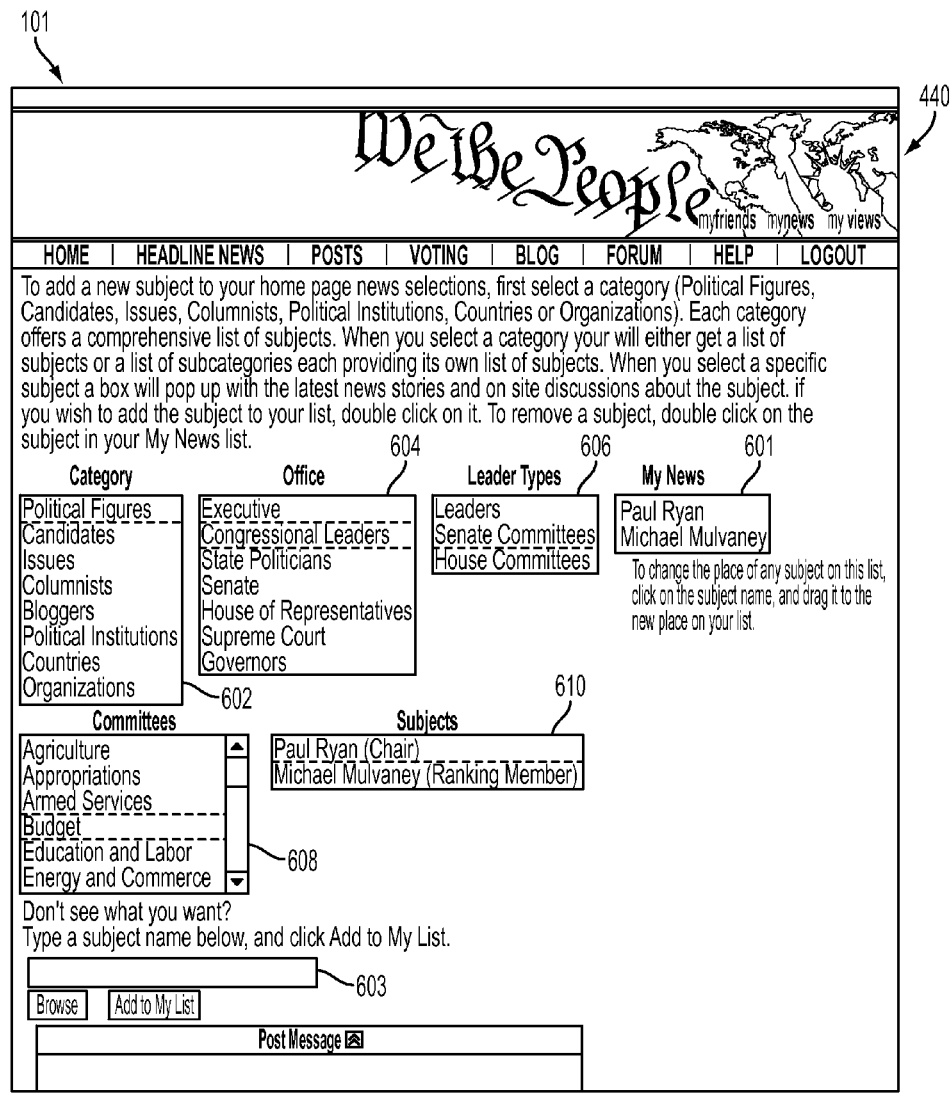
FIG. 7 illustrates one example embodiment of the interest edit screen of FIG. 6 showing multiple fields for sub-category interests.

When the selected interest has associated sub-category interests, additional fields may be provided listing the subcategory interests for selection by the user 105. FIG. 7 illustrates one example embodiment of the interest edit screen 440 showing multiple fields for sub-category interests. For example, as illustrated in FIG. 7, the interest Political Figures may be selected from field 602. This may cause an additional field 604 to be displayed showing interests that are sub-categories of the interest Political Figures. If the user 105 selects the interest Congressional Leaders from field 604, then an additional field 606 may be provided displaying sub-categories of Congressional Leaders. As shown in FIG. 7, the user may select the interest House Committees from field 606. This may cause an additional field 608 to display showing interests that are sub-categories of House Committees (e.g., the names of individual House Committees). When the user 105 selects the interest Budget, an additional field 610 may list sub-categories of the interest Budget, here the names of the committee chair, interest Paul Ryan, and the committee ranking member (Michael Mulvaney). In the Examiner illustrated in FIG. 7, both of the interests Paul Ryan and Michael Mulvaney have been selected by the user 105 and are illustrated at the My News field 601. The intermediate interests (e.g., Political Figures, Congressional Leaders, House Committees and Budget) are not listed at the My News field 601. In various embodiments, however, these intermediate interests may also be listed at the My News field 601 and used to generate the profile for the user 105.

Figure 8:
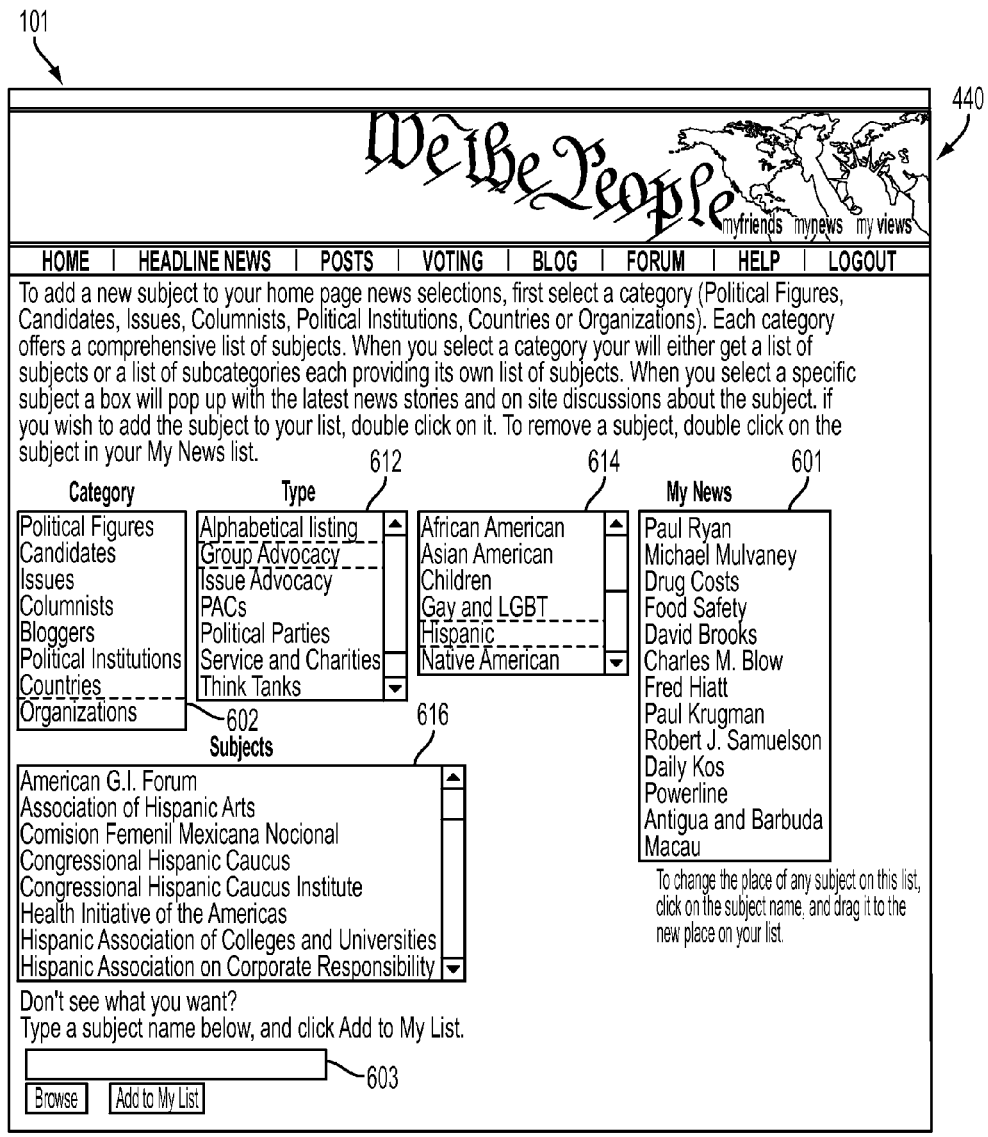
FIG. 8 illustrates one example embodiment of the interest screen of FIG. 6 showing multiple fields for sub-category interests under an alternative set of interests and sub-category interests.

It will be appreciated that any combination of interests and sub-category interests may be selected and not just the combination shown. Further, it will be appreciated that although the chain shown comprises four intermediate interests, some interests may comprise more or fewer intermediate interests. For example, FIG. 8 illustrates another example embodiment of the interest screen 440 showing multiple fields for sub-category interests under an alternative set of interests and sub-category interests. As shown in FIG. 8, the user 105 has selected the interest Organizations. A field 612 lists sub-category interests of Organizations. From the field 612, as shown in FIG. 8, the user 105 has selected Group Advocacy. Sub-category interests of Group Advocacy are displayed at field 614. From field 614, the user 105 has selected Hispanic, causing a list of sub-categories of the interest Hispanic to be displayed at field 616. As illustrated, the user 105 may select one of the interests from field 616, causing it to be displayed at the My News field 601 and used as a part of the profile of the user 105.

Figure 9:
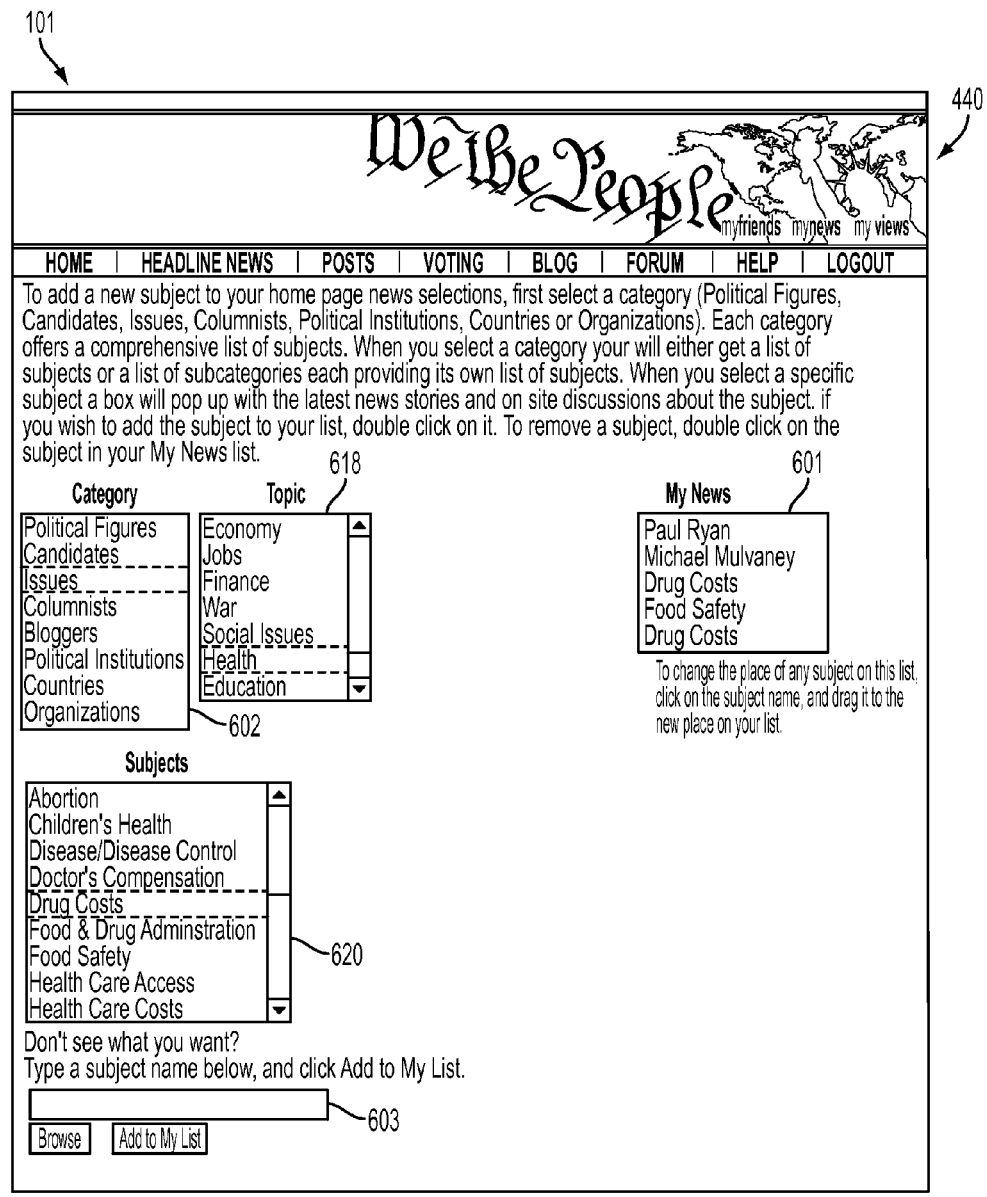
FIG. 9 illustrates one example embodiment of the interest edit screen of FIG. 6 showing multiple fields for sub-category interests under yet another set of interests and sub-category interests.
Figure 10:
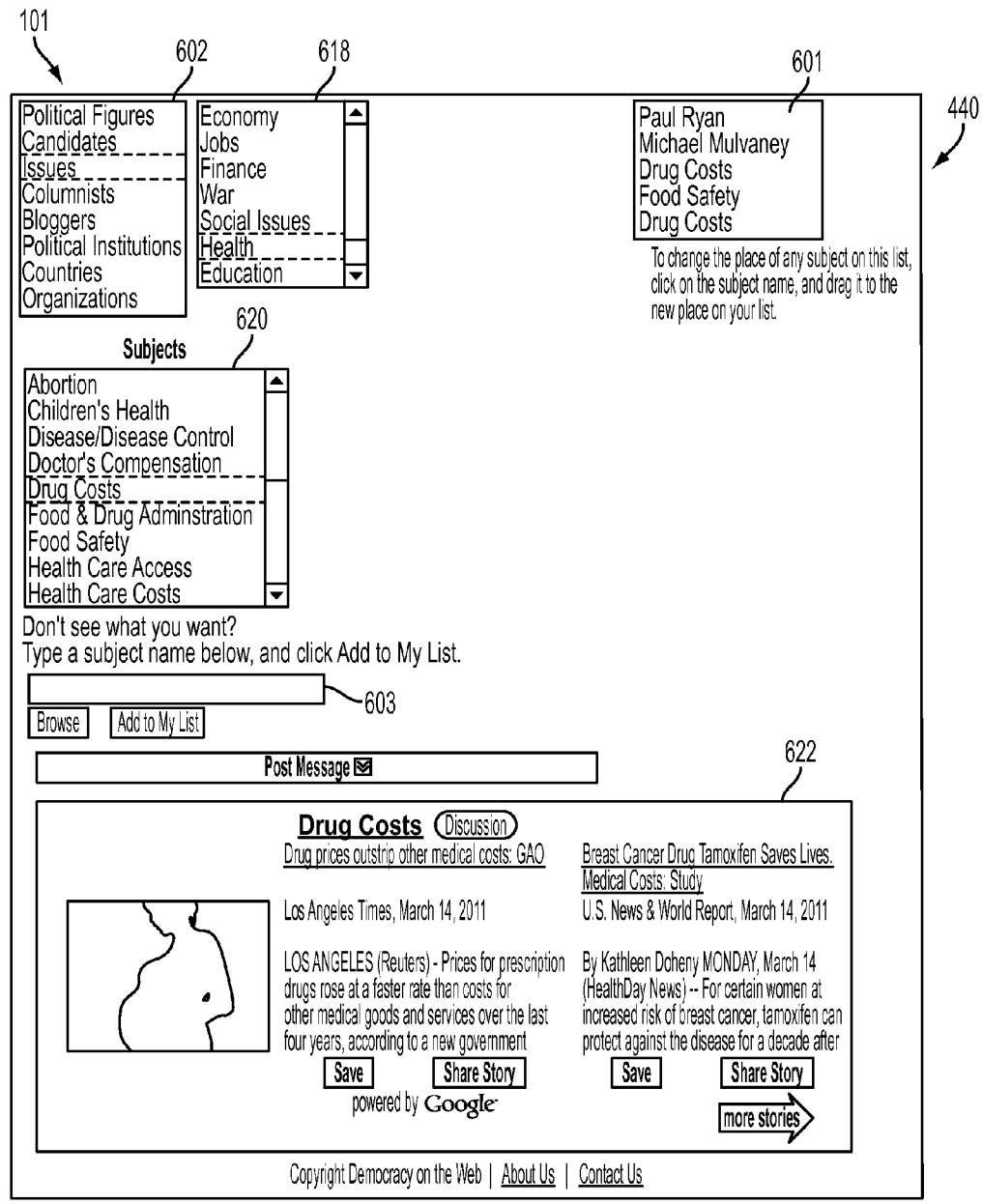
FIG. 10 illustrates one example embodiment of the interest edit screen of FIG. 6 showing a news field.

FIG. 9 illustrates one example embodiment of the interest edit screen 440 showing multiple fields for sub-category interests under yet another set of interests and sub-category interests. For example, as illustrated in FIG. 9, the user 105 has selected the interest Issues. This may cause window 618 to display sub-category interests to Issues. At field 618, the user 105 has selected Health, causing a field 620 to show sub-category interests of Health. From the field 620, the user 105 has selected the interest Drug Costs. This may cause the interest Drug Costs to appear at the My News field 601 and, as described above, become a part of the profile of the user 105. In various embodiments, selecting the interest Drug Costs may also cause a news field 622 to appear on the screen 440 showing news stories related to the selected interest (e.g., Drug Costs). For example, the interest may be associated with a search criterion or criteria (e.g., key-words) that may be applied to or provided to a content provider 108, such as a wire service or news publication, providing the links to news articles provided at field 622. FIG. 10 illustrates one example embodiment of the interest edit screen 440 showing the news field 622.

Figure 11:
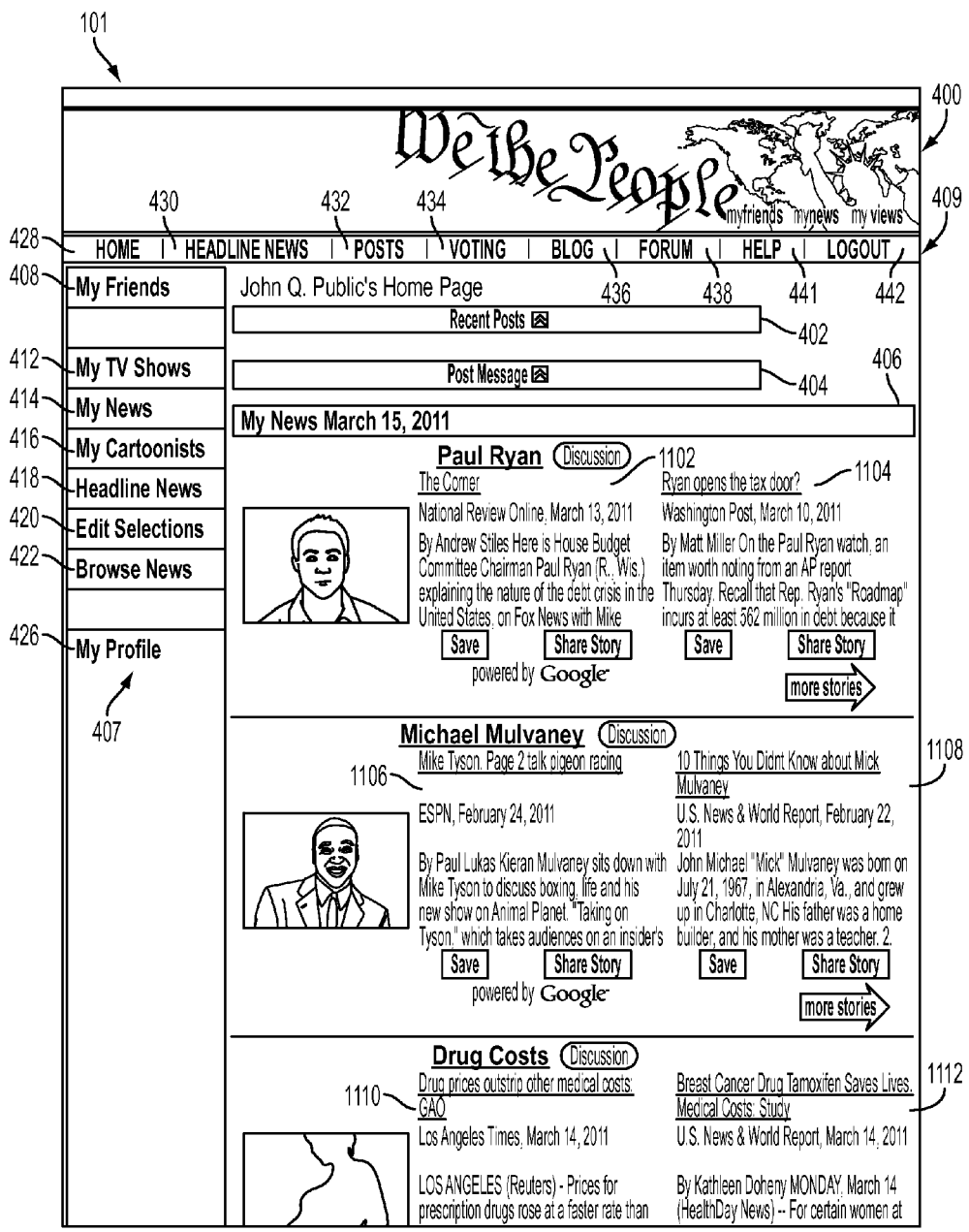
FIG. 11 illustrates one example embodiment of the home page of FIG. 4 showing the content item field populated with content items.

Once the user 105 has selected interests (e.g., sub-category interests to the My News button 502), the user 105 may perform similar selections under the Edit My TV Shows button 504 and the Edit My Cartoonists button 506 (FIG. 5). Interests and sub-category interests under these broad interests, as selected, may also be added to the user profile of the user 105. Additionally, the selected interests, either together or as part of the user profile, may be utilized to populate the content item field 406 with content items. For example, the interests comprising the user profile of the user 105 may be and/or may be linked to a set of search parameters. The search parameters may be provided to a search engine or search engines. The search engine or engines may be implemented by the computer system 102 and/or may be implemented by one or more of the content providers 108. Content items returned by the search engine or engines may be displayed at the content item field 406, either in their entirety, as a link to the content item (e.g., hosted by a content provider 108), or as a link and a summary, as shown in FIG. 11. For example, FIG. 11 shows content items 1102, 1104, 1106, 1108, 1110, 1112. Content items 1102 and 1104 may have been selected based on interest Paul Ryan. Content items 1106, 1108 may have been selected based on interest Michael Mulvaney, and content items 1110 and 1112 may have been selected based on interest Drug Costs.

Figure 12:
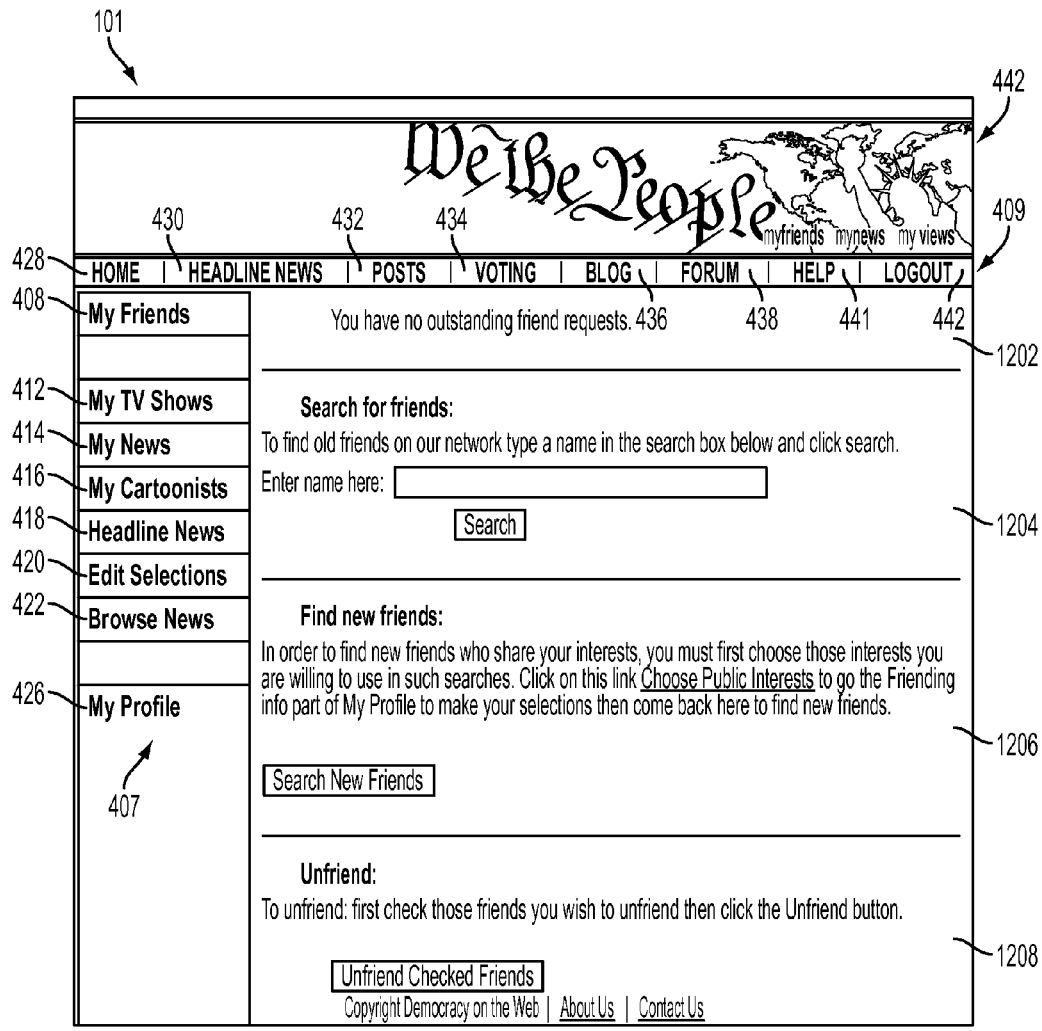
FIG. 12 illustrates one example embodiment of the friends screen of the interface of FIG. 1.

Various other buttons selected from the navigation bar 407 may provide the user 105 with access to various other functionalities of the GUI 101. For example, selecting the My Friends button 408 may cause the GUI 101 to display a friends screen 442. FIG. 12 illustrates one example embodiment of the friends screen 442 of the GUI 101. The friends screen 442 may comprise a friend request field 1202. The friend request window may list friend requests received by the user 105 from other users. In various embodiments, the friend requests listed at friend request field 1202 may be considered content items. The user 105 may select a friend request from the friend request field 1202. The GUI 101 may, subsequently, provide the user 105 with information about the request including, for example, the identity of the user making the request, and provide the user 105 when an opportunity to accept or decline the request. If the request is accepted, the requesting user may become a friend of the user 105.

A friend search field 1204 may allow the user 105 to search for potential friends (e.g., other users) by entering a name or other indicia of the desired friend. A find new friends field 1206 may allow the user 105 to search for new friends based on the user profile of the user 105. For example, the friend search may match all or a portion of the user profile 105 with the user profiles of other users to identify users who may be potential friends of the user 105. In various embodiments, the comparison may be limited to public portions of the respective users' profiles. For example, the public portion of the profile for the user 105 may be compared with the public portion of other user's profile to determine matches. Matches may be identified in any suitable way. In some embodiments, matches may be indicated by friend requests to one or both of the matched users displayed, for example, through the friend request field 1202. Also, for example, the user 105 may be matched with other users having interests in common with the user 105 (e.g., a threshold number of common interests, a threshold percentage of common interests, etc.). Also, according to various embodiments, to invigorate debate, the user 105 may be matched with other users having interests that are determined to be opposite the interests of the user 105. An unfriend field 1208 may comprise a list of all of the current friends of the user 105. The unfriend field 1208 may provide the user with functionality to remove the friend status of one or more of the listed users.

Figure 13:
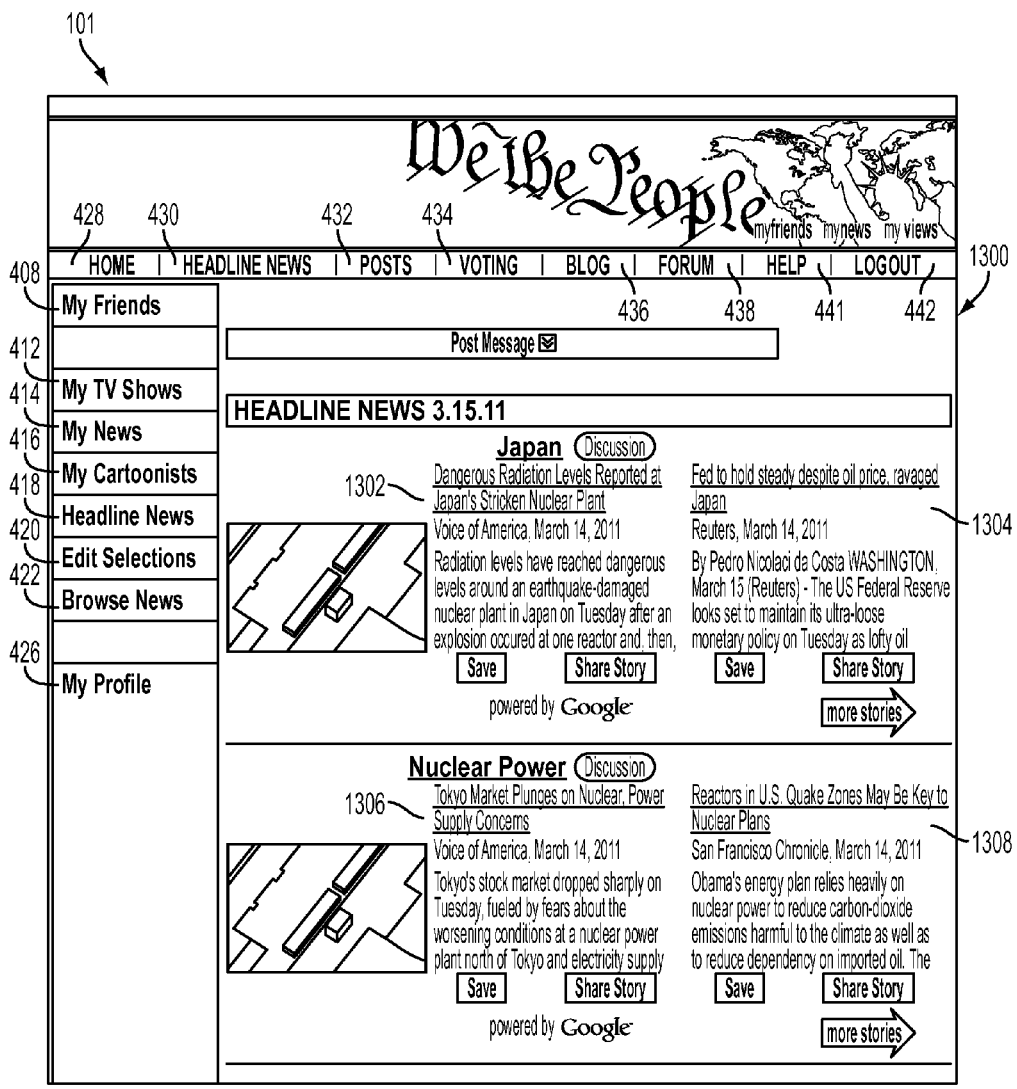
FIG. 13 illustrates one example embodiment of a Headline News screen of the interface of FIG. 1.

Referring back to the home page 400 shown at FIG. 11, the My TV Shows 412, My News 414, and My Cartoonists 416 buttons may configure the content item field 406 to display content items that are related to and/or related to sub-category interests of TV shows, News and Cartoonists, respectively. The Headline News button 418 may cause the GUI 101 to display a Headline News screen 1300. FIG. 13 illustrates one example embodiment of the Headline News screen 1300 of the GUI 101. The Headline News screen 1300 may display links to content items that are relevant to current events. For example, FIG. 13 shows content items 1302, 1304, 1306, 1308 as links coupled with content summaries (e.g., the first paragraph of the story). The content items 1302, 1304, 1306, 1308 may or may not be related to the profile of the user 105.

According to various embodiments, the Headline News screen 1300 may also be accessed by selecting the Headline News button 430 from the navigation bar 409.

Referring again back to the home page 400 shown at FIG. 11, the My Profile button 426 may allow the user 105 to access all of the interests comprising the user profile of the user 105. For example, the user 105 may be provided with functionality for adding additional interests, removing existing interests, etc. For example, in various embodiments, the user 105 may be provided with functionality for designating some portion of the user profile as public.

Figure 14:
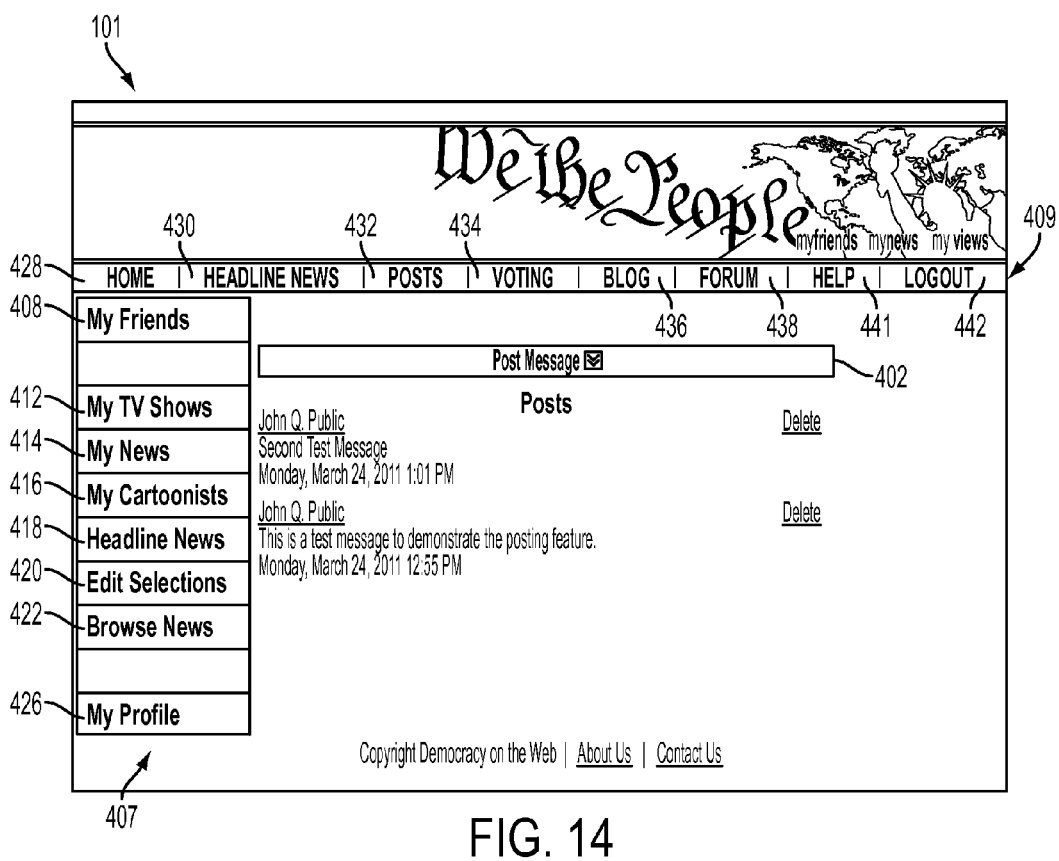
FIG. 14 illustrates one example embodiment of a Post screen of the interface of FIG. 1.
Figure 16:
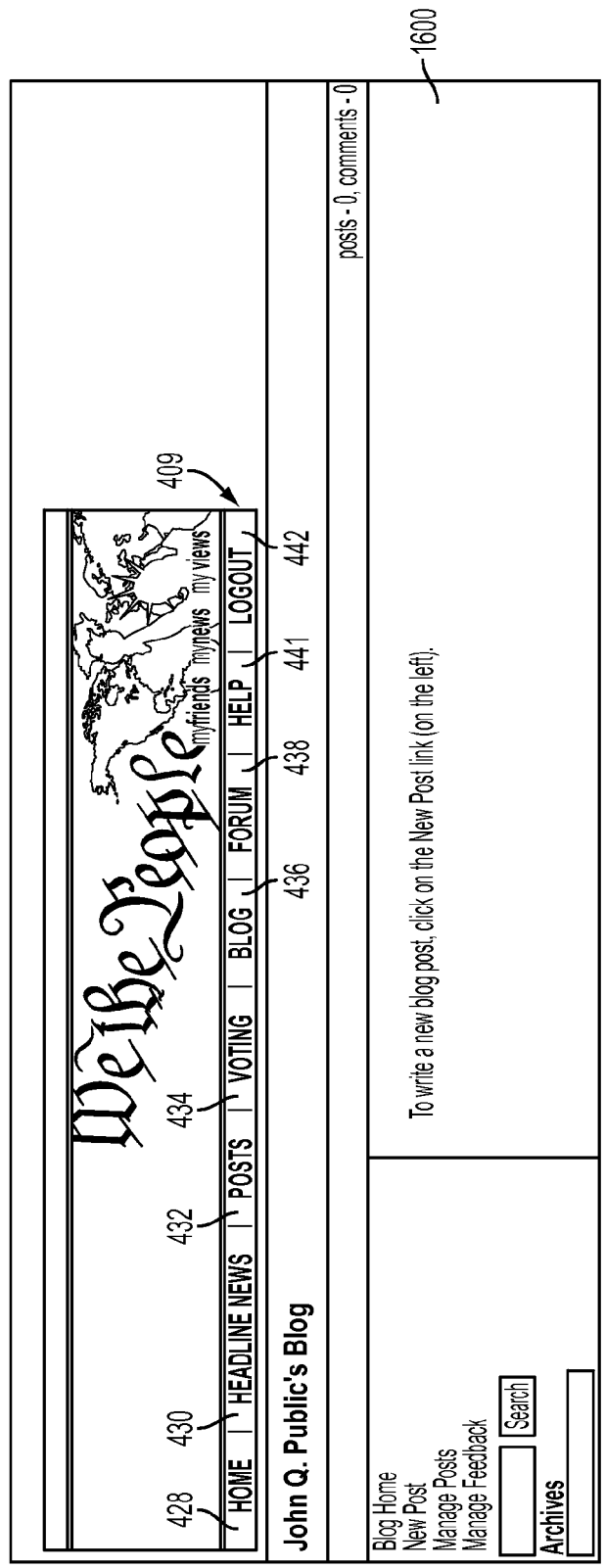
FIG. 16 illustrates one example embodiment of a Blog screen of the interface of FIG. 1.

FIG. 14 illustrates one example embodiment of a Post screen 1400 of the GUI 101. The Post screen 1400 may display the post field 402, for example, as described herein. The post field 402 may be provided at the Post screen 1400 without some or all of the additional elements of the home page 400 described herein. The Post screen 1400 may be accessible, for example, by selecting the Posts button 432 from the navigation bar 409. Similar to the Post screen, a Blog screen 1600 may be accessible by selecting the Blog button 436 from the navigation bar 409. FIG. 16 illustrates one example embodiment of the Blog screen 1600 of the GUI 101. The Blog screen 1600 may provide functionality for the user 105 to prepare and submit blog posts. Blog posts may be similar to the posts provide at the post field 402. In various embodiments, however, posts at the field 402 may be accessible only to existing friends of the user while blog posts may be made accessible to all users (e.g., at the option of the creating user 105). For example, in some embodiments posts shown to the user on the Post screen 1400 and the Blog screen 1600 may be considered content items and may be provided to other users as content items when the blog posts match the other users' respective user profiles. In various embodiments, some or all posts at the respective screens 1400, 1600 may be considered public content items and may be provided to users only when the user's public profile portion matches the posts. Any other suitable privacy level may apply as well (e.g., user only, friends only, etc.). It will be appreciated that, in some embodiments, the functionalities of posting and blogging may be combined into a single function. For example, the user 105 may be provided with an option of whether to consider a post a friends-only statement or a content item searchable by other users.

Figure 15:
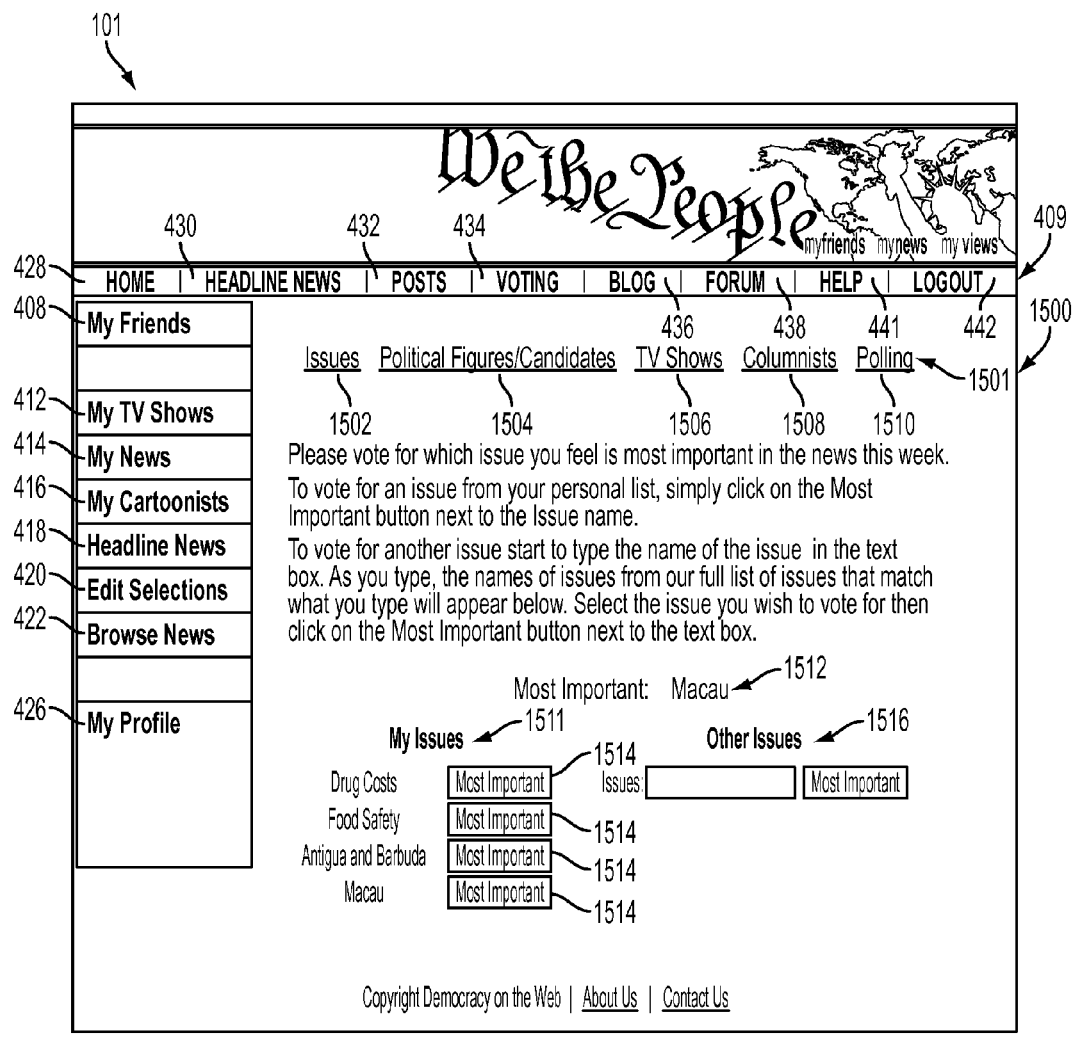
FIG. 15 illustrates one example embodiment of a Voting screen of the interface of FIG. 1.

FIG. 15 illustrates one example embodiment of a Voting screen 1500 of the GUI 101. According to various embodiments, the GUI 101 may provide the user 105, via the Voting screen 1500, an opportunity to weight the various interests of the user 105 in his or her user profile. For example, the Voting screen 1500 may comprise a list 1511 of interests previously indicated by the user 105. Each item in the list 1511 may have an associated voting button 1514. Selecting the voting button 1514 associated with an interest in the list 1511 may cause a weighting to be added to the associated interest. For example, the associated interest may be given more weight when determining which content items are to be delivered to the user. Also, in various embodiments, content items selected at least in part based on the associated interest may be listed first at the content item field 406. According to various embodiments, the user 105 may select or vote for one interest from each of a plurality of interest categories. For example, the interests shown in the list 1511 of FIG. 15 are sub-category interests of Issues 1502. To list, and vote for, sub-category interests of other broad interests, the user 105 may, for example, select one of Political Figures/Candidates 1504, TV Shows 1506, Columnists 1508 and Polling 1510. Additional interests may be displayed. Also, in some embodiments, the user 105 may be permitted to vote for as many interests as they choose. For example, the number of times that the user 105 votes for a particular interest may determine the interest's weighting in the user profile of the user 105.

Figure 17:
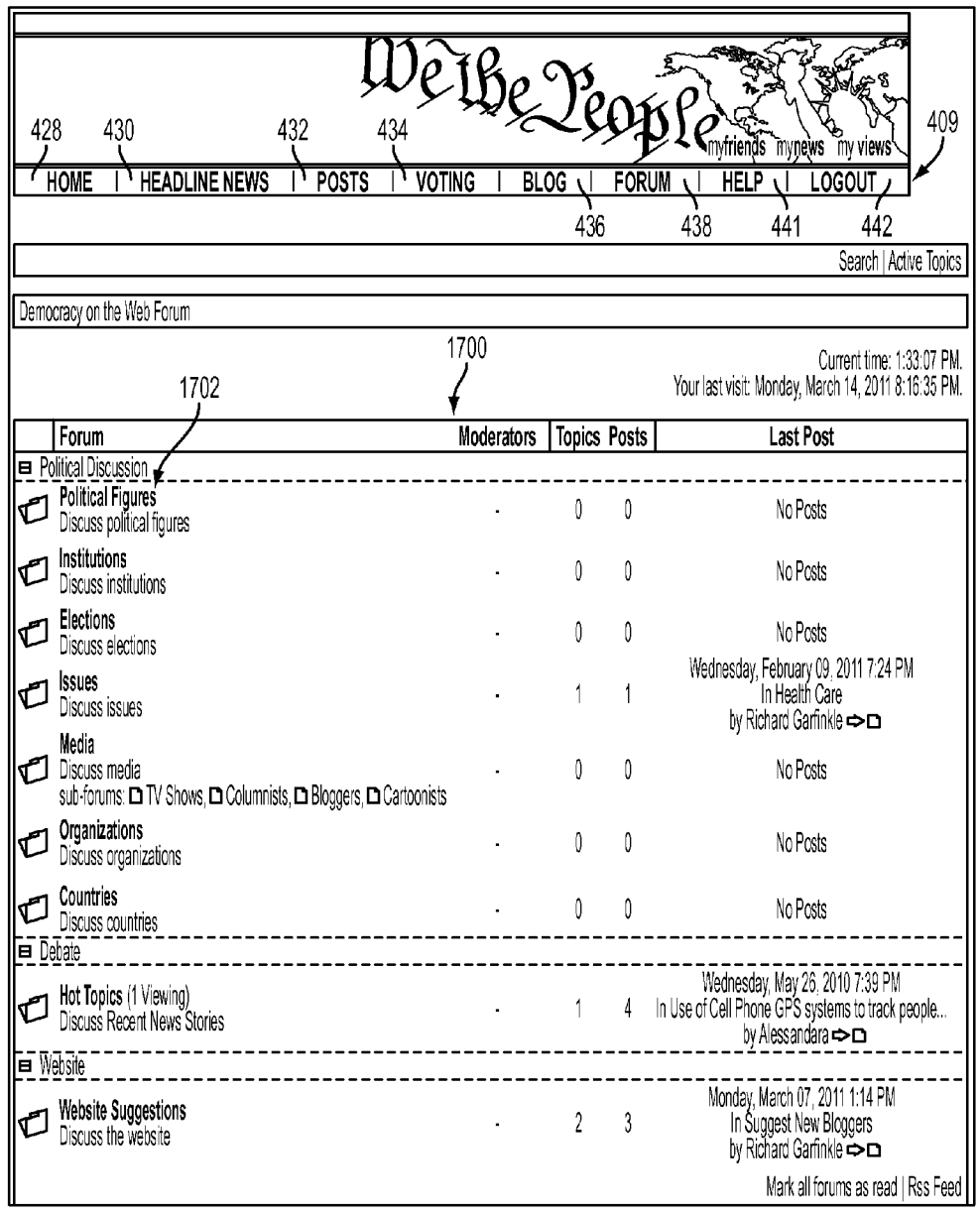
FIG. 17 illustrates one example embodiment of a Forum screen of the interface of FIG. 1.

FIG. 17 illustrates one example embodiment of a Forum screen 1700 of the GUI 101. The Forum screen 1700 may be accessed, for example, by selecting the Forum button 338 of the navigation bar 409. The Forum screen 1700 may provide functionality allowing the user 105 to read messages written by other users (e.g., not necessarily friends) and make new posts or replies to prior posts that may be accessible to all users. The Forum screen 1700 may comprise a topic column 1702 listing potential topics for discussion. To read a post, make a new post, or respond to an existing post, the user may first select from the column 1702 a topic related to the desired post. Referring back to FIG. 11, the home page 400 may also comprise a Help button 441 and a Logout button 442 on the navigation bar 407. The Help button 441 may provide the user with help functionality related to the GUI 101. The Logout button 442 may allow the user 105 to log-out of the GUI 101. Forum posts, in various embodiments, may be considered content items and may have a privacy setting determined, for example, based on the privacy setting of the interest used to select the forum post, or based on an indication provided by the posting user.

As described herein, various advertising, product offers, and/or promotions may be provided to the users 105. These items may be provided to the users 105 in any suitable manner. For example, they may be provided as banner ads in any of the screens discussed herein. Also, for example, they may be provided as content items in the content item field 406 or any other field or screen described herein where content items, or indications of content items are present. As described, advertising, product offers and/or promotions provided to a particular user may be selected, for example, based on the user's user profile and, in various embodiments, a public portion of the user's user profile.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients (e.g., the users 105 and user devices 104) or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers or computer devices. Software or other sets of instructions that may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer device," "computer system," "system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various embodiments of the systems and methods described herein may employ one or more electronic computer networks to promote communication among different components, transfer data, or to share resources and information. Such computer networks, such as network 103, can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A computer-implemented method for targeting content based on user interests, the method comprising:
   providing, by a computer system, a graphical user interface to a first user, wherein the computer system comprises at least one processor and operatively associated memory;
   displaying, by the computer system, to the first user and through the graphical user interface a plurality of interest categories, wherein each of the plurality of interest categories describes at least one content item;
   receiving, by the computer system and from the first user, an indication of a first category selected from the plurality of interest categories;
   upon receiving the indication of the first category, displaying, by the computer system, to the first user and through the graphical user interface, a plurality of sub-categories of the first interest category;
   receiving, by the computer system and from the first user, an indication of a selected group of sub-categories chosen from the plurality of sub-categories;
   selecting, by the computer system, a plurality of content items based on the selected group of sub-categories, wherein the plurality of content items comprises a first group of content items selected based on a first portion of the group of sub-categories and a second group of content items selected based on a second portion of the group of sub-categories;

providing, by the computer system, the first plurality of content items to the first user through the user interface;

receiving from the first user an association between the first portion of the selected group of sub-categories and a first privacy level, wherein the first privacy level indicates a first group of users authorized to receive content items selected from the first group of content items; and receiving from the first user an association between the second portion of the selected group of sub-categories and a second privacy level, wherein the second privacy level indicates a second group of users authorized to receive content items selected from the second group of content items.

2. The method of claim 1, wherein the first group of users comprises at least one user and the second group of users comprises at least one user.

3. The method of claim 1, the method further comprising:
providing a homepage to the first user through the user interface;
displaying the homepage to the first user, wherein the user is part of the first group of users and the second group of users, wherein the homepage, as displayed to the first user, comprises the first group of content items and the second group of content items; and
displaying the homepage to a second user that is part of the second group of users and not part of the first group of users, wherein the homepage, as displayed to the second user, comprises the second group of content items and does not comprise the first group of content items.

4. The method of claim 1, wherein the plurality of content items further comprises a third group of content items selected based on a third portion of the group of sub-categories, the method further comprising receiving from the first user an association between a third portion of the selected group of sub-categories and a public privacy level, wherein the public privacy level indicates that the third group of content items are public.

5. The method of claim 4, the method further comprising:
providing a homepage to the first user through the user interface;
displaying the homepage to the first user, wherein the homepage, as displayed to the first user comprises the first and second groups of content items;
displaying the homepage to a second user that is associated with the first user, wherein the homepage, as displayed to the second user, comprises the second group of content items; and
displaying the homepage to a third user that is not associated with the first user, wherein the homepage, as displayed to the third user, comprises the third group of content items.

6. The method of claim 4, further comprising:
selecting, by the computer system, a plurality of advertisements based on the third portion of the selected group of sub-categories; and
providing, by the computer system, the plurality of advertisements to the first user through the user interface.

7. The method of claim 6, wherein at least one of the plurality of advertisements comprises a link to a home page of a third party hosted by the computer system.

8. The method of claim 7, further comprising accruing an advertising expense when at least one user accesses the home page of the third party.

9. The method of claim 4, further comprising:
matching, by the computer system, the first user with a second user based on the third portion of the selected group of sub-categories.

10. The method of claim 9, wherein the first user and the second user have access to a common resource through the graphical user interface.

11. The method of claim 10, wherein the common resource is selected from a group consisting of a post by the first user and a post by the second user.

12. The method of claim 10, further comprising providing to the first user, by the computer system and through the graphical user interface, an invitation to contact the second user.

13. The method of claim 1, wherein the first interest category is related to at least one current event.

14. The method of claim 13, wherein the plurality of sub-categories comprises at least one sub-category selected from the group consisting of a public issue, a news topic, a political figure, a candidate, a political institution, a geographical locality, a pundit and a media program.

15. The method of claim 1, further comprising receiving from the first user an indication of a weighting for at least one of the selected group of sub-categories, wherein the selecting the first plurality of content items comprises considering the weighting.

16. A system for targeting content based on user interests, the system comprising:
a computer system comprising at least one processor and operatively associated memory, wherein the computer system is programmed to:
provide a graphical user interface to a first user;
display to the first user and through the graphical user interface a plurality of interest categories, wherein each of the plurality of interest categories describes at least one content item;
receive from the first user, an indication of a first category selected from the plurality of interest categories;
upon receiving the indication of the first category, display to the first user and through the graphical user interface, a plurality of sub-categories of the first interest category;
receive from the first user, an indication of a selected group of sub-categories chosen from the plurality of sub-categories;
select a plurality of content items based on the selected group of sub-categories, wherein the plurality of content items comprises a first group of content items selected based on a first portion of the group of sub-categories and a second group of content items selected based on a second portion of the group of sub-categories;
provide the first plurality of content items to the first user through the user interface;
receive from the first user an association between the first portion of the selected group of sub-categories and a first privacy level, wherein the first privacy level indicates a first group of users authorized to receive content items selected from the first group of content items; and
receive from the first user an association between the second portion of the selected group of sub-categories and a second privacy level, wherein the second privacy level indicates a second group of users authorized to receive content items selected from the second group of content items.

17. The system of claim 16, wherein the first group of users comprises at least one user and the second group of users comprises at least one user.

18. The system of claim 16, wherein the computer system is further programmed to:
provide a homepage to the first user through the user interface;
display the homepage to the first user, wherein the first user is part of the first group of users and the second group of users, wherein the homepage, as displayed to the first user, comprises the first group of content items and the second group of content items; and
display the homepage to a second user that is part of the second group of users and not part of the first group of users, wherein the homepage, as displayed to the second user, comprises the first group of content items and does not comprise the second group of content items.

19. The system of claim 16, wherein the plurality of content items further comprises a third group of content items selected based on a third portion of the group of sub-categories, and wherein the computer system is further programmed to receive from the first user an association between a third portion of the selected group of sub-categories and a public privacy level, wherein the public privacy level indicates that the third group of content items are public.

20. The system of claim 19, wherein the computer system is further programmed to:
provide a homepage to the first user through the user interface;
display the homepage to the first user, wherein the homepage, as displayed to the first user comprises the first and second groups of content items;
display the homepage to a second user that is associated with the first user, wherein the homepage, as displayed to the second user, comprises the second group of content items; and
display the homepage to a third user that is not associated with the first user, wherein the homepage, as displayed to the third user, comprises the third group of content items.

21. The system of claim 19, wherein the computer system is further programmed to:
select a plurality of advertisements based on the third portion of the selected group of sub-categories; and
provide the plurality of advertisements to the first user through the user interface.

22. The system of claim 21, wherein at least one of the plurality of advertisements comprises a link to a home page of a third party hosted by the computer system.

23. The system of claim 22, wherein the computer system is further programmed to accrue an advertising expense to the third party when at least one user accesses the home page of the third party.

24. The system of claim 19, wherein the computer system is further programmed to match the first user with a second user based on the third portion of the selected group of sub-categories.

25. The system of claim 24 wherein the first user and the second user have access to a common resource through the graphical user interface.

26. The system of claim 25, wherein the common resource is selected from a group consisting of a post by the first user and a post by the second user.

27. The system of claim 25, wherein the computer system is further programmed to provide to the first user, through the graphical user interface, an invitation to contact the second user.

28. The system of claim 16, wherein the first interest category is related to at least one current event.

29. The system of claim 28, wherein the plurality of sub-categories comprises at least one sub-category selected from the group consisting of a news topic, a politician, a pundit, and a television program.

30. The system of claim 16, wherein the computer system is further programmed to receive from the first user an indication of a weighting for at least one of the selected group of sub-categories, wherein the selecting the first plurality of content items comprises considering the weighting.

\* \* \* \* \*